United States Patent [19]

Fleissner

[11] 3,938,920

[45] Feb. 17, 1976

[54] DEVICE FOR LIMITING THE PRESSING FORCE TO A PRE-ESTABLISHED VALUE IN MECHANICAL PRESSES

[75] Inventor: Roland Fleissner, Bichl, Germany

[73] Assignee: Dorst-Keramikmaschinen-Bau, Kochel, Germany

[22] Filed: Feb. 11, 1974

[21] Appl. No.: 440,994

[30] Foreign Application Priority Data

Feb. 12, 1973 Germany ........................ 2306747

[52] U.S. Cl. ................................ 425/78; 425/406

[51] Int. Cl.[2] ........................................ B29C 3/00

[58] Field of Search ....... 91/47, 358 A; 425/78, 406

[56] References Cited

UNITED STATES PATENTS

| | | | |
|---|---|---|---|
| 2,805,447 | 9/1957 | Voges | 425/406 X |
| 3,202,737 | 8/1965 | Isuda | 425/406 X |

*Primary Examiner*—Robert L. Spicer, Jr.
*Attorney, Agent, or Firm*—Price, Heneveld, Huizenga & Cooper

[57] ABSTRACT

The specification describes a device for limiting the pressing force to a pre-established value in mechanical presses with an upper punch, which is mounted on the upper tup via a hydraulic cushion, which is connected via an overpressure valve and a pump with a pressure medium supply held in a pressureless condition. At the connection between the hydraulic cushion and the excess pressure valve, a duct is connected which opens in a pressureless manner and this duct is closed by valve whose closing pressure can be adjusted.

14 Claims, 1 Drawing Figure

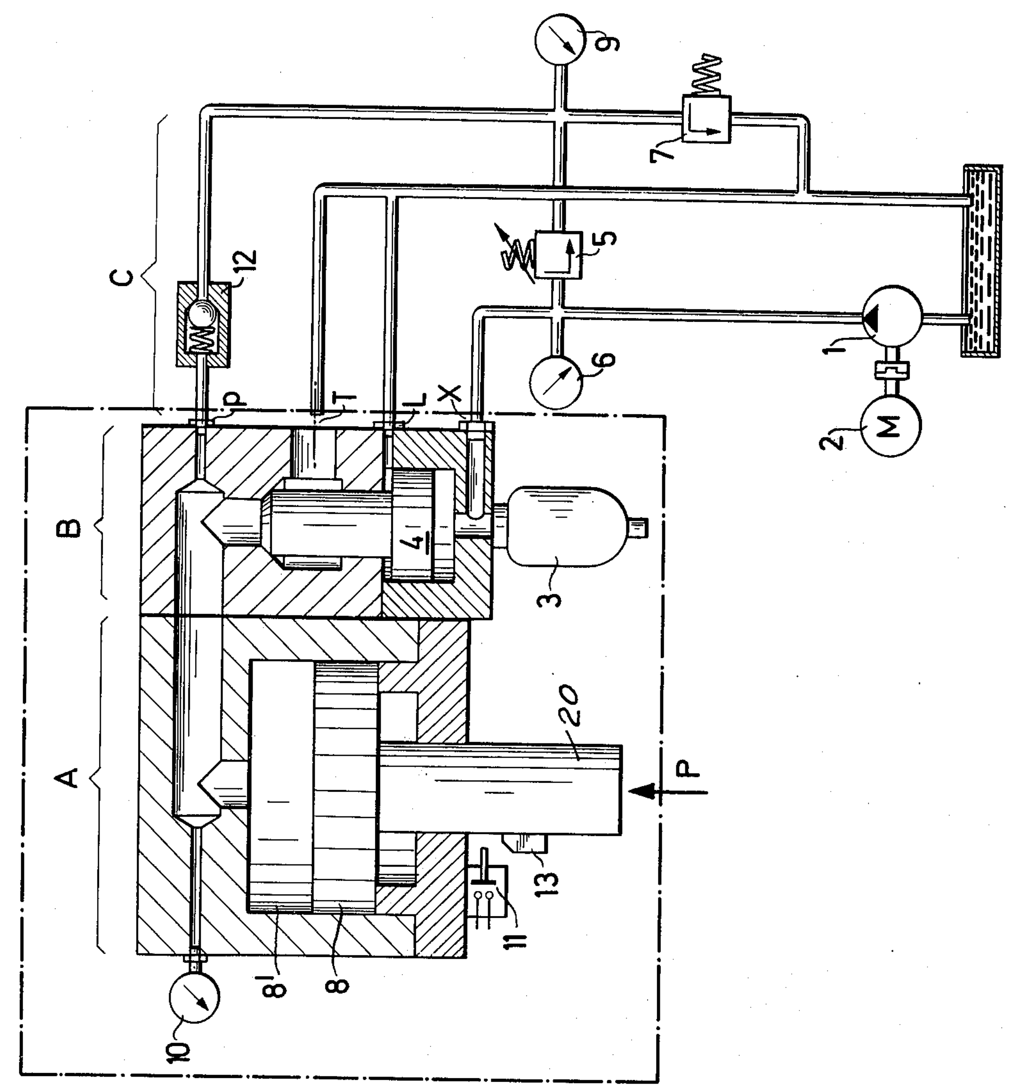
A
B
C
p
T
L
X
1
2
M
3
4
5
6
7
8
8'
9
10
11
12
13
20
P

DEVICE FOR LIMITING THE PRESSING FORCE TO A PRE-ESTABLISHED VALUE IN MECHANICAL PRESSES

BACKGROUND OF THE INVENTION

I. Field to Which Invention Relates

The invention relates to a device for limiting the pressing force to a pre-established value in mechanical presses with an upper punch, which is mounted on the upper tup via a hydraulic cushion, which is connected via an overpressure or pressure-relief valve and a pump with a pressure medium supply held in a pressureless condition.

II. The Prior Art

Such mechanical presses are used, usually in the form of thrust crank, eccentric or toggle lever presses for example for the compaction of pulverulent compositions to form solid bodies.

In the compaction such powder or pulverulent compositions to form solid bodies a basic distinction is drawn between two types of methods.

In the case of pressing to a constant height, which is used in the majority of cases, it is desired to produce bodies keeping to fixed dimensions. Since the properties of the material to be pressed are generally very constant, if the pressing die is filled to the proper volume only slight changes or variations in density occur between one pressed component and another.

In pressing to a constant pressure, the aim is that of pressing every pressed component with the same pressing or compression force so that, even in the case of different degrees of filling, components or parts with the same density are produced. This requirement can, however, only be achieved with the sacrifice of different heights of the components or parts, that is to say, the upper punch must be able to vary correspondingly in position, that is, compensation for the difference in component thickness.

In the case of material to be pressed with difficult filling properties and varying bulk density, the requirement more particularly comes into existence of undertaking the pressing operation with a constant pressure parameter. Since in this respect mouldings or pressings with a different height are produced, the pressing must generally be subsequently mehcanically worked or machined in order to achieve the correct final dimensions. This method is used for example in the case of the production of $UO_2$ pellets for reactor fuel rods and in the case of some types of metallic carbides for wear-resistant parts.

A special case requiring a constant parameter of compression pressure in constituted by the calibration of flat sintered iron parts. The sintered parts often have variations in height of a few tenths of a millimeter. Since in accordance with the part height and the material during subsequent pressing to achieve a constant height, the differences in the part heights are taken up by the elasticity of the tool and the machine, pressing to a constant height is, in this case, liable to lead to excessively high loading of the tool and of the machine. Therefore, in such cases pressing to a constant pressure is preferred and the resulting pressings are calibrated or manufactured with the same pressing force, though in some circumstances they may have different heights.

In the case of pressing to a constant height, small, harmless variations in pressure must be compensated for without excessively high variations in the part height of the resulting pressings. If, however, owing to incorrect functioning or improper operation, for example, when a second filling is placed in the die without ejection of the previously produced pressing, danger of overloading of the tool or the press results and the device should be capable of avoiding such overloading or damage, that is to say, the upper punch must be able to yield without further buildup of pressure and the machine must be stopped.

In the case of pressing to the same density, the device should be capable of compensating for differences in the density of filling, that is to say, the pressing force should always achieve the same predetermined pressure. After achieving this predetermined pressure, the upper punch must be able to yield in an upward direction without a further increase in pressure. At the same time, however, the device must also ensure that, in the case of faulty operation, no overload occurs.

This problem has been recognized and various attempts have been made to solve it.

Thus, for example, the measure has been adopted of connecting with the hydraulic cushion a pressure accumulator, which is loaded with nitrogen at the respective opening pressure. This system has disadvantages, however. On changing the pressing force, it is necessary to charge the accumulator with additional gas from a nitrogen cylinder or nitrogen must be removed from the pressure accumulator. The gauge or manometor for the pressing force cannot be used to read off or determine the respective working pressure.

In the case of large presses, the hydraulic cushion becomes too large, since nitrogen supply cylinders are generally filled with a maximum pressure of 140 atmospheres gauge.

Finally, the hydraulic cushion must be precharged with the respective pressing force, that is to say, in the nonloaded, i.e., nonactual part-forming condition the pressing plunger exerts on the cover, which is generally attached with screws, a pressure in the order or magnitude of the actual pressing or part-forming force. In the case of large presses, this leads to a very complicated design.

In the case of another previously proposed form of construction, an excess pressure valve is connected between the hydraulic cushion and the pressure accumulator. This construction can, however, not be found satisfactory either.

The valves must be precontrolled or set due to the large quantities of oil flowing through them. Since the valves must respond to the same pressure during each operating stroke, lack of precision in the opening pressure occurs and, therefore, there is a lack of precision as regards the pressing force.

The precise opening pressure can, on the one hand, only be set by spring loading of the excess or overload pressure valve. This in itself also leads to a lack of accuracy.

Since the pressing operation is often carried out with displacement of large volumes of oil, the oil may be considerably heated by flowing through the excess pressure valve. This heating is increased by the fact that it is always the same oil which is displaced backwards and forwards between the hydraulic cushion and the pressure medium accumulator.

In the case of a third prior art device, the preloading of the hydraulic cushion is brought about by its own pumping unit via an excess or overload pressure valve. Certain disadvantages result from this, more particularly, the disadvantage of extra filling of the pressure accumulator, and in the case of large presses, high pressure pumps must be employed. The disadvantages that the respective working pressure cannot be read from the pressing force gauge and the hydraulic cushion must be preloaded at the respective pressing force, nevertheless remain.

SUMMARY OF THE INVENTION

One aim of the invention is to provide a device which makes possible not only pressing to a constant height but also pressing to a constant pressure and also serves as a means for preventing overloading and also in addition deals with the disadvantages existing in the case of previously proposed apparatuses.

A further aim of the invention is to provide a device for limiting the pressing force to a predetermined value in mechanical presses, with which it is possible to carry out pressing operations both to a constant height and also to a constant pressure and simultaneously in the case of both types of pressing operations, provides for overload protection.

The invention consists in a device for limiting the pressing force to a pre-established value in mechanical presses with an upper punch, which is mounted on the upper tup via a hydraulic cushion, which is connected via an overpressure valve and a pump with a pressure medium supply held in a pressureless or neutral condition, characterized in that at the connection between the hydraulic cushion and the excess pressure valve, a duct is connected which opens into a neutral or pressureless discharge area and this duct is closed by a valve, the closing pressure of which can be adjusted.

Preferably, the valve is provided with a piston which is pressed so that one end face of the piston lies against a seat, and the other end face of the piston is subjected to an adjustable pressure and behind the end face pressed against the seat the piston is surrounded by an annular space which is connected with the duct which opens into the neutral or pressureless area.

Preferably, the piston is constructed as a stepped or headed piston, whose large surface is subjected to the adjustable pressure.

In accordance with a further development of this proposal, the space adjacent to the back of the piston step or head is preferably also connected with the line or duct which opens in to the neutral or pressureless area in order in this manner, to be able to discharge without back pressure oil which leaks past the step.

The excess pressure valve is preferably adjustable so that it can be used for producing the adjustable closing pressure desired.

In accordance with a further embodiment of the invention, the connection between the excess or overload pressure valve and the hydraulic cushion is connected via an excess pressure valve with a fixed setting with the duct which opens to the neutral or pressureless area.

Finally, in accordance with a still further feature of the invention, in order to provide security as regards overloading, a mechanical switch can be provided to operate in the path of the upper punch.

DESCRIPTION OF THE PREFERRED EMBODIMENTS

The accompanying drawing shows in a single FIGURE an embodiment of the invention.

The device consists of a cylinder A, a valve B, and a hydraulic part C. The parts A and B are attached on the upper tup of the mechanical press and, therefore, take part in and respond to its stroke. The upper punch of the pressing tool is attached to the rod-like upper punch mount 20 of piston 8 of the cylinder A so that the pressing operation is carried out by the mechanically produced stroke of the upper tup via the hydraulic cushion 8'. The respective pressing force occurring can be read off at the manometer or pressure gauge 10.

A hydraulic pump driven by an electric motor 2 conveys the pressure medium, preferably oil under pressure, into the connection X of the valve B, and as a result, the pressure accumulator 3 and the piston 4 are acted upon with the preset pressure, which can be set at the valve 5 and can be read off at the pressure gauge 6.

In the case of the embodiment shown, the oil bled off via the valve 5 is put under pressure once again by the excess pressure valve 7 and passes through the check valve 12 and port *p* of the valve B to act upon the piston 4 on its smaller piston surface and in the cylinder A acts upon the pressing piston 8, which carries the upper punch, not shown. The pressure at the port *p* can be read off at the pressure gauge or manometer 9.

The pressing force P acting through the punch mount 20 produces a pressure in the hydraulic cushion which acts on the small piston surface of the stepped piston 4. As long as the pressure exerted on the small piston surface of the stepped piston 4 tending to open it is less than the opposing or closing force exerted by the punch pressure at the connection X on the large piston surface of the piston 4, the upper punch of the tool will always move to the same level, since the oil of the hydraulic cushion cannot escape. Naturally, in the case of this discussion, the compressibility of the oil and the mechanical displacement or extension of the machine is not taken into account.

If the opening force at the stepped piston 4, however, reaches the magnitude of the closing force, the stepped piston 4 is moved from its seat so that oil can flow from the hydraulic cushion 8' without a further increase in pressure occurring. The pressing piston 8, therefore, remains stationary while maintaining the pressure set, although the press tup moves further downward with the cylinder A. It is to be pointed out that the stepped piston 4 is only moved from its seat a sufficient amount to allow the escape of that amount of the oil necessary to maintain the preset pressure. If the piston has slipped a certain adjustable amount, the press is stopped by the switch 11 being actuated by a projection or ramp fixed on the piston 8.

In the case of operation with a constant height product, the pump pressure at the valve 5 is set at such a high value that the working pressure, resulting in the hydraulic cushion 8', is just short of the level required for response of the valve B, that is to say, the closing pressure is so selected that on response of the system, the tool and the press are not yet overloaded.

In the case of operation with a constant pressing force, the pump pressure is set at the valve 5 at such a high level that the valve B opens on every working stroke and thus allows the escape of the excess quantity of oil into the pressure medium supply.

It is thus possible to ensure that on every press stroke the same pressing force is achieved. On the following return movement of the upper punch, the pump 1 passes or returns the displaced oil into the space of the hydraulic cushion 8' so that the piston returns to its starting position.

The pressure accumulator 3 can, as such, be omitted, though it should be provided in the case of the use of a stepped piston, because, in this case, a favorable damping of the movement of the stepped piston is achieved.

A particular advantage of the device in accordance with the invention resides in that the action on the end, remote from the seat, of the stepped piston can be remotely controlled, because, as is made clear by the drawing, the regulatable pressure valve 5 and the motor with its setting means can be arranged at a considerable distance from the press by the use of suitably long ducts and can be placed in a zone which is readily accessible.

It will further be seen that owing to the device in accordance with the invention, only a slight preloading pressure is exerted on the hydraulic cushion and furthermore, the pressing pressure can be read off at the pressure gauge 10 in each case.

All defects mentioned initially as regards the prior art are therefore dealt with and the aim of the invention is completely attained.

The embodiments of the invention in which an exclusive property or privilege is claimed are defined as follows:

1. A device for limiting the pressing force to a pre-established value in a mechanical press, said press having an upper punch mount, hydraulic cushion means mounting said upper punch mount, a reservoir for hydraulic fluid and a prime mover driven pump and conduit means connecting said pump to said hydraulic cushion, a first pressure relief valve in said conduit, said device characterized in that a relief duct is provided interconnecting said hydraulic cushion and said reservoir; a second pressure relief valve in said duct, said second pressure relief valve being adjustable for varying the maximum hydraulic pressure exerted by said hydraulic cushion means.

2. A device in accordance with claim 1 further characterized in that said second pressure relief valve has a valve seat and a piston, said piston having a pair of spaced ends, one of said ends being normally pressed against said seat and exposed to the hydraulic pressure of said hydraulic cushion; the other end of said piston being exposed to the hydraulic pressure of that portion of said conduit between said pump and first pressure relief valve, an annular space surrounding said piston adjacent said valve seat, said annular space being connected to said reservoir.

3. A device in accordance with claim 2 further characterized in that the diameter of said other end of said piston is greater than the diameter of said one end thereof.

4. A device in accordance with claim 3 further characterized in that said piston is provided with a circumferential step intermediate its ends, a bleed passage connecting the area exterior of said piston and adjacent the axially facing surface of said step to said reservoir.

5. A device in accordance with claim 3 further characterized in that said other end of said piston is connected with a pressure accumulator.

6. A device in accordance with claim 4 further characterized in that said first pressure relief valve is adjustable.

7. A device in accordance with claim 6 further characterized in that in the path of said upper punch, an electrical switch is provided responsive to overtravel of the punch.

8. A device in accordance with claim 1 further characterized in that said first pressure relief valve is adjustable.

9. A device in accordance with claim 2 further characterized in that in the path of the upper punch, a mechanical switch is provided responsive to overtravel of the punch.

10. A device for adjustably limiting the pressing force exerted by the upper punch mount of a mechanical press, a hydraulic cushion having piston means forming said upper punch mount, said device comprising: a pressure relief valve having a smaller end and a larger end; said smaller end surrounded by a valve portion and in hydraulic communication with said hydraulic cushion; a valve seat for said valve portion; a pressure head on said pressure relief valve facing oppositely from said smaller end; a pressure chamber; said pressure head seated in said chamber and having a surface in said chamber greater than the area of said smaller end; a source of hydraulic fluid under pressure connected to both said hydraulic cushion and to said chamber; an adjustable pressure valve between said chamber and said hydraulic cushion; said pressure relief valve having a pressure relief port communicating with said hydraulic cushion when said pressure relief valve opens in response to the hydraulic force operating on said smaller end exceeding the hydraulic force operating on said pressure head.

11. The device described in claim 10 wherein a check valve is provided between said hydraulic cushion and said ajustable valve to prevent discharge of fluid from said hydraulic cushion.

12. In a mechanical press having an upper punch mount, a device for limiting the pressing force exerted by said punch mount, to a pre-established value said press having a hydraulic cushion, said hydraulic cushion backing the upper punch mount, a headed pressure relief valve communicating with said hydraulic cushion, said valve hydraulically held by said head in normally closed position, a source of hydraulic fluid under pressure, said device characterized in that conduit means are provided connecting both said pressure relief valve head and said hydraulic cushion to said source of pressurized fluid, said conduit means having both an adjustable pressure valve and a return flow closed check valve between said pressure relief valve head and said hydraulic cushion for balancing the hydraulic pressures acting on said hydraulic cushion and said pressure relief valve head while preventing the escape of fluid from said hydraulic cushion except through said relief valve; a maximum pressure control valve communicating with said conduit means between said pressure relief valve head and said check valve for discharging fluid from behind said head and permitting said pressure relief valve to open when a predetermined pressure has been attained.

13. The device described in claim 12 wherein the effective surface area of the head end of said pressure relief valve acted upon by hydraulic fluid is greater than the effective surface area of said valve end acted upon by hydraulic fluid.

14. In a mechanical press having an upper punch mount, a device for limiting the pressing force exerted by said punch mount, to a pre-established value said press having a hydraulic cushion, said hydraulic cushion backing the upper punch mount, a headed pressure relief valve communicating with said hydraulic cushion, said valve hydraulically held by said head in a normally closed position, a source of hydraulic fluid under pressure, said device characterized in that means are provided for connecting both said pressure relief valve head end and said hydraulic cushion to a source of pressure, said means including a maximum pressure relief valve communicating only with said head end of said pressure relief valve for discharging fluid from behind said head end and permitting said pressure relief valve communicating with said hydraulic cushion to open; said pressure relief valve having means biasing it to closed position until the hydraulic force acting upon its valve end exceeds that acting upon its head end by a predetermined amount.

* * * * *